Jan 6, 1931.　　　　H. C. WHITE　　　　1,787,843
COMBINED TAIL LAMP AND STOP LIGHT
Filed April 26, 1924　　2 Sheets-Sheet 1
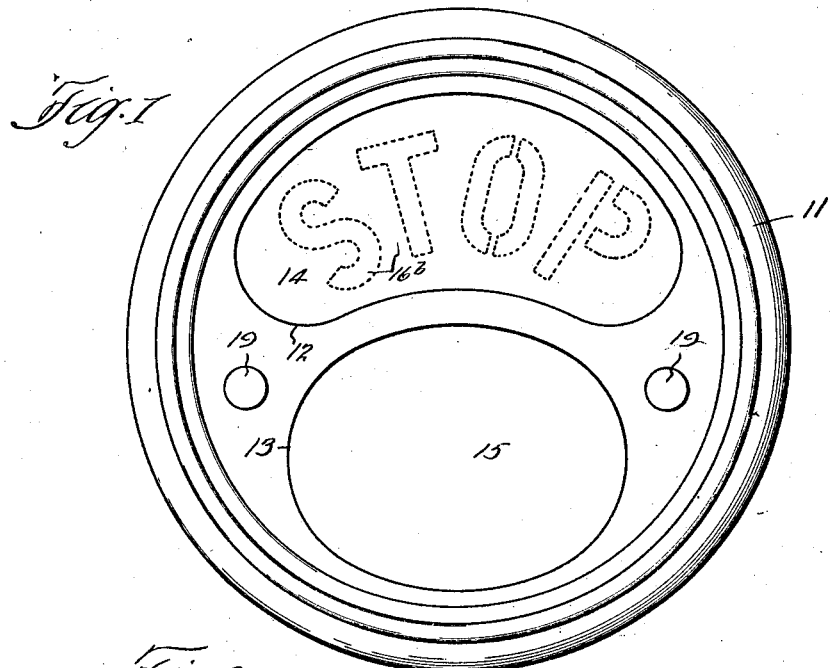
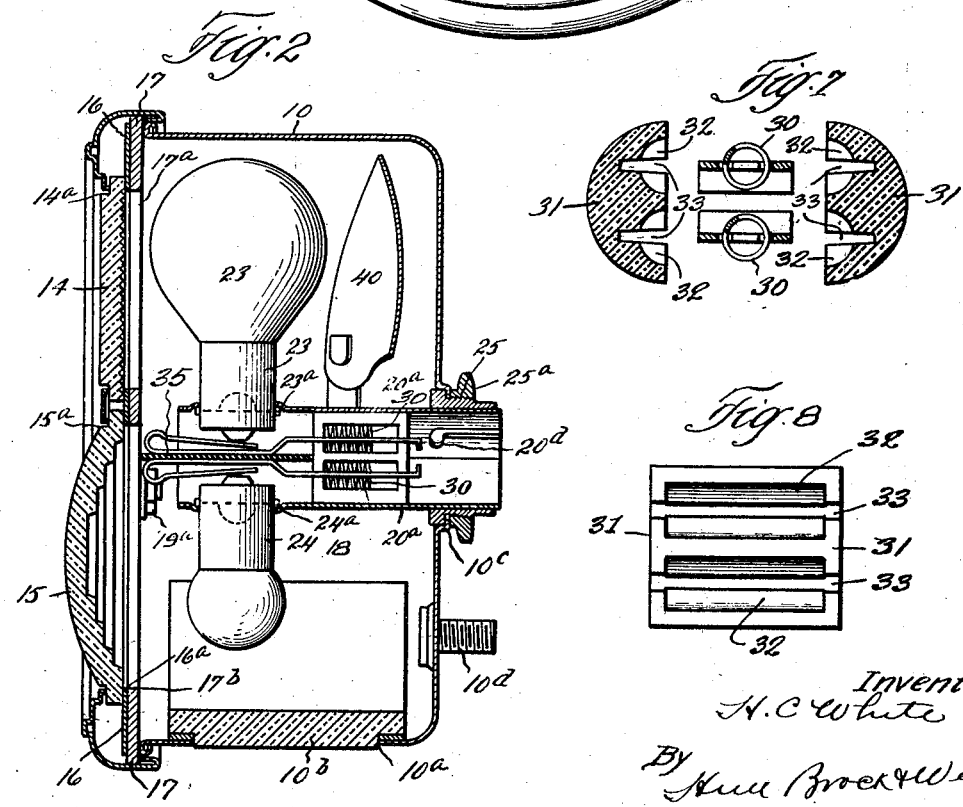

Jan 6, 1931.   H. C. WHITE   1,787,843
COMBINED TAIL LAMP AND STOP LIGHT
Filed April 26, 1924   2 Sheets-Sheet 2
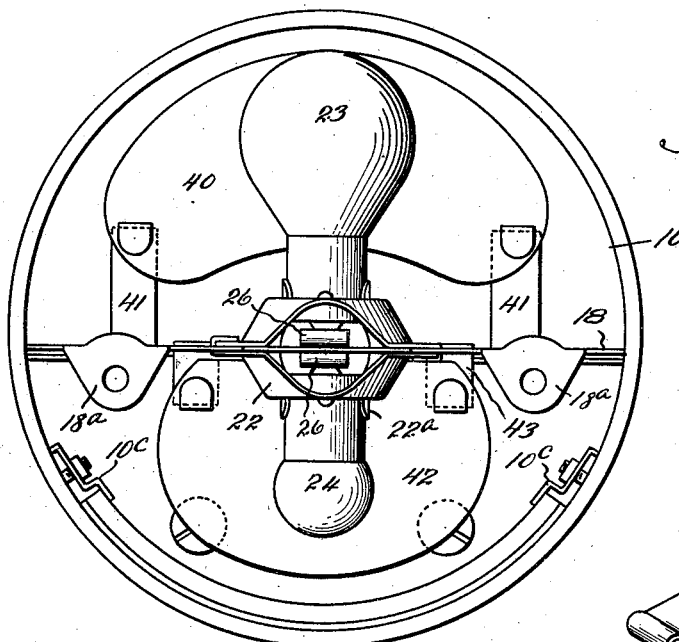
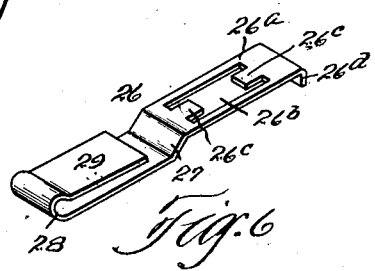
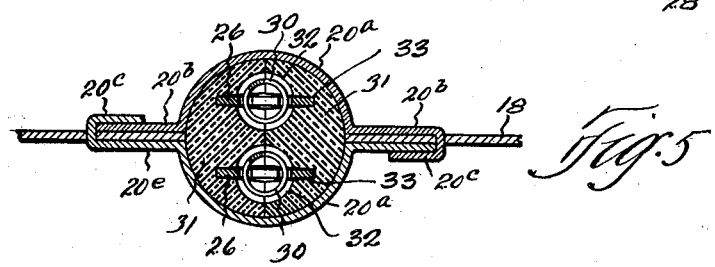
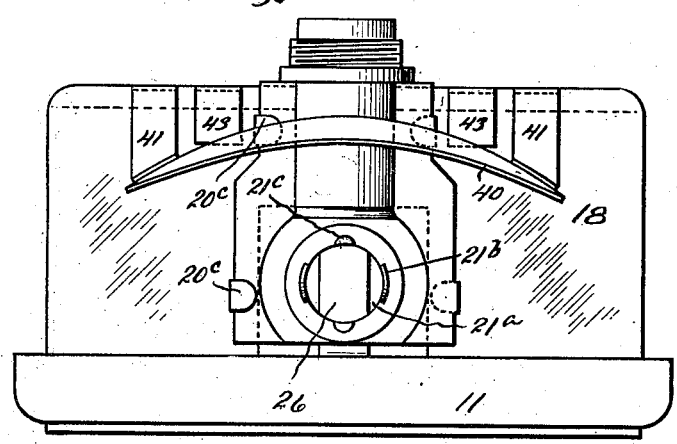
Inventor
H. C. White
By
Hull Brock & West
Attys.

Patented Jan. 6, 1931

1,787,843

UNITED STATES PATENT OFFICE

HAROLD C. WHITE, OF LAKEWOOD, OHIO, ASSIGNOR, BY MESNE ASSIGNMENTS, TO DELCO REMY CORPORATION, OF ANDERSON, INDIANA, A CORPORATION OF DELAWARE

COMBINED TAIL LAMP AND STOP LIGHT

Application filed April 26, 1924. Serial No. 709,118.

This invention is a combined stop and tail light for use upon the rear end of an automobile and serves the double purpose of displaying the usual tail light, and flashing a warning signal at the rear whenever the speed of the automobile is checked so as to give a warning signal to the operator of the car behind.

Heretofore combined stop and tail lights have been provided in which the casing has been divided into compartments, and each compartment has been provided with a lamp receiving socket and also with plug connections for establishing the line connections with the lamps.

The object of the present invention is to greatly simplify the construction of the combined stop and tail light by the provision of a novel construction of partition which serves the triple function of subdividing the casing into two compartments, providing the receiving means for the incandescent lamps and also the receiving means for the plug connections whereby the conductor wires are connected to the lamps.

Another object of the invention is to provide for simplicity of structure and ease of manufacture so that the cost of production can be materially reduced and at the same time improve the quality of the article as a whole.

With these various objects in view the invention consists primarily in providing a subdividing partition for a lamp casing said partition being of such a nature as to provide receiving portions for the incandescent lamps, and also provide a suitable socket for the plug connection for the conductors, said partition also serving as a convenient point of attachment for the front of the lamp casing.

The invention consists also in certain details of construction and novel features of combination all of which will be fully described hereinafter and set forth in the appended claims.

In the drawings forming a part of this specification Fig. 1 is a face view of a combined stop and tail light embodying my invention; Fig. 2 is a vertical sectional view, the incandescent lamps being shown in elevation; Fig. 3 is a face view of the casing with the partition arranged therein; Fig. 4 is a plan view of the front ring with the partition secured thereto with the casing removed; Fig. 5 is a detail sectional view of a part of the partition plate with the contact plug secured therein; Fig. 6 is a detail perspective view of one of the contact plates; Fig. 7 is a detail sectional view of parts of the contact plug disconnected; and Fig. 8 is a detail face view of one of the insulator sections.

In carrying out my invention I employ a substantially cylindrical sheet metal casing 10 to which is applied a front ring 11. The ring 11 is dished as shown in Figs. 1 and 2. An annular cork washer 17 is secured on the face of the casing and over this washer there is provided an annular ring member 16 as shown in Fig. 2. The stop light glass 14 and the tail light glass 15 are carried by the ring member and clamped between the ring and the annular member 16. The stop light glass is preferably formed with a prismatic back arranged in advance of the cork packing sheet 17, this sheet being preferably formed with openings 14$^a$ cut in the form of letters to provide the word "Stop" or any other warning legend. The front ring is provided with an inturned portion which engages with an overhanging peripheral portion on the casing which serves to hold the ring member in place on the casing.

An opening 10$^a$ is provided in the bottom of the casing said openings being normally closed by means of a curved glass 10$^b$ secured within the casing by means of clamps 10$^c$ as shown in Fig. 3 so that rays of light may be projected downwardly upon the license plate which is usually arranged beneath the lamp casing.

The casing 10 is divided into an upper and a lower compartment by means of a horizontal partition plate 18 which is substantially flat and is provided with downturned apertured ears 18$^a$ and is adapted to be rigidly secured to the front ring by means of screws 19 and nuts 19$^a$. The partition plate 18 is provided with a cut-out portion as seen in Figs. 4 and 5 which is adapted to receive a socket 20$^a$. The socket 20$^a$, shown in detail in Figs. 4 and 5, comprises an upper half provided with a semi-circular portion and with flat extending portions 20$^b$ on each side thereof, the extending portions 20$^b$ each being provided with oppositely projecting ears 20$^c$ which are adapted to pass through corresponding slots in the partition plate 18 and to be bent over the lower half which is similarly formed, whereby to secure the same to the plate 18. The upper half of the socket is provided with a circular aperture 21$^a$ which is adapted to receive an incandescent lamp, and in punching the opening 21$^a$ guide tongues 21$^b$ and 21$^c$ are provided preferably at oppositely disposed points in order to provide ample bearing for the socket of the lamp 23. The lower half of the socket is provided with a similar aperture for receiving the lamp 24. The two halves when secured as described form a socket which extends rearwardly through an opening in the rear of the casing and is secured to the casing by means of the collar 25 and nut 25$^a$.

The partition plate is also provided with oppositely extending lugs 41 and 43 which receive and support reflectors 40 and 42, respectively. The reflector for the tail light may be omitted if desired as shown in Fig. 2.

It will now be clear that if each half of the socket is semi-circular that when the two halves are secured together as hereinbefore described, that they form a substantially cylindrical socket which is attached to the partition plate and to the casing 10. The incandescent lamps are arranged one above the other on opposite sides of the partition plate in close proximity to each other, and in practice it is usual to have the upper lamp of higher candlepower than the lower lamp. When the two halves 20$^a$ are fastened to the partition plate 18 they will provide a cylindrical socket as previously described and in which contact plates for the incandescent lamps can be carried and into which a plug can be fitted for the purpose of establishing electrical connections for the lamps and the completed cylindrical socket will have the usual bayonet slot 20$^d$ for the purpose of securing the plug in the cylindrical socket.

Two contact plates 27 are employed, one for each lamp and each plate has a flat rear portion 26 apertured at 26$^b$ and is formed with a flange 26$^d$ at the extreme rear end. The opening 26$^b$ is for the purpose of receiving coil spring 30 and a tongue 26$^c$ is formed at one or both ends of the opening for the purpose of positioning the end or ends of the coil spring thereon and thereby holding the spring within the opening. The forward portion of the contact plate is bowed as shown at 29, this bowed portion contacting with the lamp terminal and assisting through its resiliency in maintaining the lamp secure as the spring action of the contact plates serves to maintain the laterally projecting pins of the lamp socket in engagement with the portions 21$^c$. The contact plates 27 with the springs 30 arranged therein are held between the insulating blocks 31 and the blocks with the plates therein are then inserted between the portions 20$^a$. The blocks are semi-circular in cross section as shown and are formed with semi-circular shaped recesses 32 and slots 33 communicating therewith, the recesses 32 receiving the springs 30 and the slots 33 receiving the side edges of the contact plates. The springs 30 yieldingly hold members 26 in contact with the lamp terminals whether or not the usual connector plug, not shown, is in place in the outer end of the cylindrical socket formed by the members 20$^a$. The rear flanged ends of the contact plates project rearwardly into the cylindrical socket into which the plug is fitted and the extreme forward ends of the contact plates contact with and bear upon a strip of insulating material 35 held in a recess in the partition 18 as most clearly shown in Fig. 2. This permits a definite amount of sliding movement of the contact plates when establishing connection and permits the utilization of the resiliency of the bowed portions of the plates for maintaining the lamps firmly in position.

By having the tongues 26$^c$ projecting into the opening 26$^b$ the springs are quickly and easily positioned within said openings and then become a component part of the contact plate and this permits the quick and easy assemblage of the contact plates between the insulating blocks.

The partition 18 shaped as described and having the socket 20$^a$ secured thereto as described and connected thereto provides not only a partition for subdividing the casing into two compartments but it also provides the receiving portions for the incandescent lamps and likewise the plug receiving means and socket cooperating therewith, and all of these various parts are quickly and easily made and connected together, and when assembled provide a lamp which is simpler and more efficient and durable than those heretofore constructed but one which owing to the novel features of construction can be manufactured at a considerably less cost.

It will thus be seen that I provide a combination lamp of such construction that all of the objects hereinbefore recited can be accomplished.

Having thus described my invention, what I claim is:

1. In a device of the kind described, the combination with a pair of apertured flat spring contact plates, of coil springs arranged in the apertures of said plates, complementary insulator blocks having opposed slots slidably receiving the intermediate portions of said plates, the ends of said plates protruding at the ends of the blocks and opposed recesses receiving the springs and a cylindrical member in which said blocks are fitted.

2. In a device of the kind described, the combination with a casing, of a partition arranged within the casing and dividing the same into two compartments, said partition having an opening, a plug receiving cylinder arranged within said opening, said cylinder having oppositely disposed lamp receiving openings at the forward end, insulating means fitting in said cylinder, contact plates carried by said insulating means, and having their forward and rear ends projecting from said means and springs carried by said plates within the means and arranged to yieldingly hold the plates in position.

3. In a lamp socket the combination of tubular means formed at one end to receive the usual connector plug and at the other end to provide a socket for receiving a lamp bulb, a bulb in the socket, insulating means fitted within and between the ends of the tubular means, said insulating means being provided with a longitudinal bore, said bore being of increased cross section between its ends, a flat spring contact member fitting slidably in the bore and having its outer end arranged to resiliently engage the terminal of the bulb and hold it in the socket, the other end of the contact member extending outwardly of the insulating means for engagement with the connector plug, and spring means housed within the enlarged portion of the bore for yieldingly holding the contact member in engagement with the bulb.

4. In a lamp socket the combination of tubular means formed at one end to receive the usual connector plug and at the other end to provide opposed sockets for receiving lamp bulbs, bulbs in the sockets, insulating means within and between the ends of the tubular means, said insulating means being provided with a plurality of longitudinal bores, said bores being of increased cross section between their ends, contact members extending through the bores and having their outer ends return bent to yieldingly engage the terminals of the bulbs and hold them in their sockets, the other ends of the contact members extending outwardly of the insulating means for engagement with the connector plug, and spring means housed within the enlarged portions of the bores for yieldingly holding the contact members in engagement with their respective bulbs.

In testimony whereof, I hereunto affix my signature.

HAROLD C. WHITE.